(12) United States Patent
McDonough et al.

(10) Patent No.: US 7,505,732 B2
(45) Date of Patent: Mar. 17, 2009

(54) BROADCASTING USER-SPECIFIC INFORMATION

(75) Inventors: John C. McDonough, Nahant, MA (US); Nina K. Harvey, Boston, MA (US); Boris Olegovich Kalinichenko, Jamaica Plain, MA (US)

(73) Assignee: FMR LLC, Boston, MA (US)

( * ) Notice: Subject to any disclaimer, the term of this patent is extended or adjusted under 35 U.S.C. 154(b) by 153 days.

(21) Appl. No.: 11/019,910

(22) Filed: Dec. 22, 2004

(65) Prior Publication Data

US 2006/0234685 A1   Oct. 19, 2006

(51) Int. Cl.
*H04H 20/71* (2008.01)
*H04M 3/42* (2006.01)

(52) U.S. Cl. .................. 455/3.01; 455/3.04; 455/414.1

(58) Field of Classification Search ................ 455/3.01, 455/3.02, 130, 154, 414.1, 414.2, 414.3, 455/414.4, 3.04, 507, 517
See application file for complete search history.

(56) References Cited

U.S. PATENT DOCUMENTS

| | | | |
|---|---|---|---|
| 6,317,784 B1 * | 11/2001 | Mackintosh et al. | 709/219 |
| 6,434,477 B1 * | 8/2002 | Goss et al. | 701/117 |
| 6,657,568 B1 | 12/2003 | Coelho et al. | |
| 6,658,062 B1 * | 12/2003 | Nakatsuyama | 375/259 |
| 6,658,231 B2 | 12/2003 | Nakatsuyama | |
| 6,686,880 B1 | 2/2004 | Marko et al. | |
| 6,957,041 B2 * | 10/2005 | Christensen et al. | 455/3.06 |
| 2002/0161685 A1 | 10/2002 | Dwinnell | |
| 2002/0188746 A1 * | 12/2002 | Drosset et al. | 709/231 |
| 2003/0014767 A1 | 1/2003 | Stumphauzer, II | |
| 2004/0049389 A1 | 3/2004 | Marko et al. | |
| 2008/0119132 A1 * | 5/2008 | Rao | 455/3.04 |

FOREIGN PATENT DOCUMENTS

GB   2342260 A  *  4/2000

OTHER PUBLICATIONS

Notification of Transmittal of the International Search Report or the Declaration, International Search Report, and Written Opinion dated Nov. 27, 2006.

* cited by examiner

*Primary Examiner*—Sonny Trinh
(74) *Attorney, Agent, or Firm*—Proskauer Rose LLP (57) ABSTRACT

Described are methods and systems, including computer program products, for broadcasting user-specific information through satellite radio or digital radio. Generally, information specific to a user is correlated with an identifier associated with a receiver associated with the user, and the information is broadcast to the receiver, such that use of the information is restricted to the receiver.

51 Claims, 5 Drawing Sheets

BROADCASTING USER-SPECIFIC INFORMATION

FIELD OF THE INVENTION

The present invention relates to broadcasting user-specific information.

BACKGROUND OF THE INVENTION

Information has become increasingly available to the general public in recent years. Information that took a day or more to disseminate now is typically distributed in a matter of minutes or even seconds. As access to information increasingly contributes to productivity and efficiency gains for the economy, an increased emphasis has been placed on timely and accurate transfer of and access to this information.

For many individuals, reviewing information such as financial and business information, sports and entertainment news and information, traffic and weather information and other information are intrinsically part of their daily routine. In fact, timely and accurate receipt of information can have a dramatic impact on successful investing, efficient business operations and positive time-management. Moreover, for many individuals and businesses, information must be accessible not only when the user is in front of a computer monitor, but when he or she is traveling. Accordingly, many individuals and businesses have employed various techniques to distribute information to mobile users, such as transmitting time-sensitive information via cellular communication.

Recently, however, satellite radio has become one mode of broadcasting information to mobile users. Satellite operators provide digital quality radio broadcast services covering the entire continental United States. Plans currently include providing these services around the globe. These satellite radio services offer many channels including music, news, sports, talk radio and other programming. Moreover, digital radio is available from conventional analog radio broadcasters that provide a terrestrial based system using signals co-located in the AM and FM bands. Satellite radio improves terrestrial radio's potential by offering a better audio quality (digital quality), greater coverage and fewer commercials. As such, in October of 1997, the Federal Communications Commission (FCC) granted two national satellite radio broadcast licenses. The FCC allocated 25 megahertz (MHZ) of the electromagnetic spectrum for satellite digital broadcasting, 12.5 MHz of which are owned by Sirius Satellite Radio and 12.5 MHz of which are owned by XM Satellite Radio Inc.

Satellite radio currently operates as a quasi-open communications network to any eligible user. That is, a channel of satellite radio is available to any user who subscribes to a particular satellite radio service. For example, a subscriber to XM Satellite Radio or Sirius Satellite Radio can listen to any programming (e.g., sports talk radio channel) offered by that respective broadcast provider. Other than general access to a various premium channels, one subscriber's ability to access specific content is no different than that of a second subscriber. Moreover, content offered by satellite radio is not customized for a particular subscriber or user. In addition, a non-subscriber to satellite radio is restricted from listening to any programming offered by the satellite broadcast provider.

SUMMARY OF THE INVENTION

The invention features systems and methods, including computer program products, for broadcasting user-specific information via radio. More specifically, the description describes delivering user-specific information, such as financial information, to an authorized user of a radio receiver, such as a satellite radio receiver. Aspects utilize digital radio communication to deliver user-specific content and information to the authorized user. The techniques also discriminate between satellite radio subscribers by delivering user-specific content such as financial information to only one of the many subscribers of a satellite radio service.

In general, in one aspect, systems broadcast user-specific information through a network, such as a satellite radio service or a digital radio service. In addition, systems include an information provider that further includes a first server in communication with the network. The first server retrievably stores user-specific information. Systems of the present invention also include a broadcast provider (e.g., satellite or digital radio) that further includes a second server in communication with the network. The first and/or second database servers further include at least one identifier that is associated with a user or receiver (satellite or digital radio.) The receiver is associated with the user. The receiver also is in communication with the network, and provides an authorized user with access to the user-specific information that is broadcast by the broadcast provider. The receiver can be in communication with a second server to selectively receive the information specific to the user. In addition, the first and/or second servers can include a database server.

In another aspect, methods provide for broadcasting user-specific information. Generally, methods include receiving information specific. The information is correlated with an identifier associated with a receiver associated with the user. In addition, methods include broadcasting the information to the receiver, such that use of the information is restricted to the receiver.

In another aspect, methods include providing user-specific information from an information provider. The information provider includes a first server that is in communication with a network (such as satellite or digital radio.) In addition, the first server retrievably stores the user-specific information. The information provider also can include a server that further includes information that is associated with a specific user.

In this aspect, methods correlate the user-specific information received from the information provider with a second server operated by a broadcast provider (satellite or digital radio.) The second server is in communication with the network, and can be a database server. Networks include, for example, satellite radio and digital (high-definition) radio. In general, correlating includes matching the user-specific information with an identifier that is associated with a receiver. The receiver can be a satellite radio receiver or a digital, high definition radio receiver. Methods also include broadcasting the user-specific information to the appropriate receiver. The identifier allows an authorized user of the receiver to access the user-specific information.

The techniques described herein allow for a plurality of different users to receive user-specific information (i.e., customized information) on the same channel. For example, a broadcast over a single digital signal (or channel) can include a plurality of user-specific information, each of which is unique to a particular receiver or user. For example, a "FIDELITY" channel can broadcast various digital information over a certain frequency that includes user-specific information that is uniquely associated to one of a plurality of receivers or users. As such, an information or broadcast provider can transmit user-specific information to a particular user or receiver over one broadcast channel or signal. In operation, each of a plurality of user-specific information broadcast over a digital channel can include an identifier that is associated with a particular receiver. The identifier allows an authorized user of the receiver to access the user-specific information. In addition, the receiver including the identifier unique to the receiver can use the information specific to the user. Likewise, the receivers not including the identifier unique to the receiver will not be able to use the information specific to the user.

In some embodiments, the identifier can act as the "key" for decrypting or de-multiplexing the signal. The identifier can also be encrypted. In some embodiments, a user can input a personal identification code ("PIN" code) so that he or she can access or use the information specific to the user. Like the identifier, the PIN code can also be encrypted.

In some embodiments, a network includes a plurality of receivers. Each of the plurality of receivers is associated with an identifier that is unique to each of the respective plurality of receivers. In some embodiments, the receiver-specific identifier is stored at a server (e.g., database server) of the broadcast provider. The broadcast provider broadcasts user-specific information with the identifier so that only the receiver associated with the identifier is able to access the user-specific information. As such, the receiver selectively receives information specific to the user based on the identifier unique to the receiver.

Also in some embodiments, the network includes at least one web server. The web server is in communication with the network. The web server allows for accessing and distributing information, user-specific or general information via the Internet. In some embodiments, the web server also directs or disseminates information between the first and second database servers. The web server can act uni-directionally or bi-directionally (i.e., send and/or receive) between the first and second database servers.

Also, some embodiments can include a third database server that functions in a manner similar to the first server (operated by the information provider.) Likewise, some embodiments include a second information provider, which itself includes a server (i.e., third server) that is in communication with a network. The third database server also retrievably stores user-specific information, and can be a database server. Furthermore, in other embodiments, a third server of an information provider contains user-specific information that is redundant to or different from the second server. In such embodiments, the third database server can be in communication with the network. Like the second server, the third server also can correlate or match user-specific information with an identifier that is associated with a receiver (e.g., a satellite or digital radio receiver.) As such, the third server can broadcast the user-specific information to the appropriate receiver. The broadcast allows an authorized user of the receiver to access the user-specific information.

Also, some embodiments include a third server that functions in a manner similar to the second server (operated by the broadcast provider.) As such, multiple broadcast providers (and their respective servers) are in communication with the network. Like the second server, the third server also can correlate or match the user-specific information with an identifier that is associated with a satellite receiver, for example. Examples can include broadcasting the user-specific information to the appropriate receiver. The broadcast allows an authorized user of the receiver to access the user-specific information.

As provided herein, the techniques allow for broadcasting user specific information to a receiver that is uniquely associated with an identifier. Only the appropriate receiver will be able to access user-specific information intended to be disseminated to a particular user. User-specific information can include financial information. Financial information that is user-specific includes, among other things, a security ticker symbol, such as DELL (Dell, Inc.), MSFT (Microsoft Corporation) or GE (General Electric Company.) Financial information also can include the security name, such as Dell, Inc., Microsoft Corporation, or General Electric Company, thereby aiding an individual who is not able to associate a ticker symbol with the respective company.

Without limitation, the security and/or the security symbol are not limited to stocks, but can include its derivatives (e.g., options) or other publicly or privately traded securities such as mutual funds, bonds, commodities (e.g., gold, gas or corn) or other trading vehicles (e.g., REITs and private funds). Moreover, without limitation, the types of accounts for which financial information can be disseminated include retirement accounts (e.g., IRA or 401K accounts), trading accounts (Fidelity Investment account), and other accounts that typically is monitored by a broker, for example.

In addition, in some embodiments, financial information includes a security quote. For example, a satellite broadcast provider can receive a security ticker symbol and a security quote from an information provider that is to be transmitted to a user. This information can be general information or can be user-specific information (e.g., information taken directly from his or her trading account.) This information can be correlated by a broadcast provider to a particular satellite radio receiver through a unique identifier. For example, DELL $50.25 can be broadcast or transmitted to a specific XM Satellite receiver such that the authorized user who holds a position in Dell Computers can be informed of its current security quote. In some embodiments, the security quote that is broadcast can be a delayed quote (e.g., fifteen (15) minutes delayed) or, in other embodiments, the security quote can be in "real-time."

Likewise, other financial information can include a security position or the number of shares of a security that a user currently holds (e.g., "position") in their account. Accordingly, in some embodiments, the financial information transmitted to the receiver can include "500 shares DELL." In embodiments that are particularly advantageous for a user with a current position in a company, the financial information that is broadcast can include a market value of the security position. In other words, if a user holds 500 shares of DELL, the last trade of which was $50.25, the market value of the security position that is broadcast to the receiver (e.g., user) can include "$25,125.00".

As such, in some embodiments, financial information can include a trade order. In operation, the user can operate the receiver to broadcast back to the financial information provider (e.g., Fidelity Investments) a order for "500 shares DELL" at market, for example. In some embodiments, a user can transmit a personal identification code ("PIN") to verify that the user has access to the financial account. This is particularly of interest for security reasons. In addition to the unique identifier attached to the user-information, a PIN code can aid in verifying the identity of the user for the financial information provider.

In other embodiments, financial information can include a trade confirmation. For example, a user can request a broker (e.g., a Fidelity advisor) to trade 500 shares of DELL security if the security reached $50.25 (i.e., a "limit" order). At any time when the DELL security hits $50.25, the information provider (in this case Fidelity) can relay the information to the satellite broadcast provider. The satellite broadcast provider (e.g., Sirius Satellite Radio) can correlate the user-specific information with an identifier that is unique to a particular satellite receiver. Once broadcast, the authorized user (e.g., subscriber) of the satellite receiver can review the trade confirmation on the display of the satellite receiver or a display located on another device. In other embodiments, the receiver can provide the information audibly to a listener.

In other embodiments, financial information can include a trade recommendation from a Fidelity advisor, for example. Based upon the user (such as based upon a pre-determined watch list of securities created by the user), recommendations can be relayed to the user through the network. Similarly, news alerts related to a certain security can be transmitted to the receiver of the authorized user. Also, an account alert can be transmitted. Various types of account alerts can be broadcast to the satellite receiver. For example, a user's account can be pre-set so that if the account balance hits a certain level, a message is automatically forwarded to the user via the preferred network. Likewise, the brokerage company (e.g., Fidelity Investments) can broadcast a "margin call" to the user's receiver. In some embodiments, an account balance for a user can be broadcast periodically (or on-demand) to the receiver. Without limitation, other types of user-specific information known to those in the art can be broadcast.

For any information (but of particular interest to important or time-sensitive information), the techniques enable a broadcast provider to transmit user-specific information to a targeted user regardless of the particular signal, frequency or channel that the targeted user is then-currently receiving. For illustrative purposes, a "margin call" can be broadcast to the user (a Fidelity Investments account holder) even if the user is receiving a talk show or sports programming (a non-FIDELITY channel or signal) on his or her receiver, for example. As such, an information provider (through the broadcast provider) can "break in" to the receiver of a particular user regardless of the particular station or frequency the receiver is then-currently receiving.

Examples also include the dissemination of general information to users through the network. For example, financial information can include general information that is not necessarily associated specifically with a user. For example, general information can include each of the user-specific examples provided herein that may be transmitted regardless of whether the user has requested or has any interest in the particular financial quote, ticker symbol, a security price, a time of last trade, and news alert, for example.

The techniques described herein also can be used in business operations, such as a livery service, for example. In embodiments involving a livery service, an information provider can include a livery business organization. The livery business organization can include a database server that is in communication with a network (e.g., a satellite radio service.) The database server retrievably stores user-specific information. In some embodiments, the user of a livery service can include, for example, a livery driver.

In such embodiments, the database server correlates the user-specific (i.e., driver-specific) information by matching the user-specific information with an identifier that is associated with a receiver, such as a satellite radio receiver. Also, these embodiments can include broadcasting the user-specific information to the satellite radio receiver. The broadcast allows an authorized user (i.e., livery driver) of the satellite receiver to receive his or her user-specific information. Examples of user-specific information for a livery service includes a particular a pick-up location, a drop-off location, a time for the pick-up location, a passenger information and the like. Other information appropriate for a livery service is known to those in this business.

The techniques described herein also can be used to disseminate sports information to a satellite broadcast subscriber. On-line gaming and entertainment is a burgeoning business. When wagering, accurate and timely information can help a user "beat" the odds. For example, information as to an injury to a star player can allow a user to make a wager based upon then-current odds that do not take this injury into account. Accordingly, the techniques include user-specific information that includes sports information.

In embodiments involving a gaming or entertainment operation, an information provider can include an on-line sports wagering business. The wagering business can include a database server that is in communication with a network (e.g., a digital radio service). The database server retrievably stores user-specific information. In some embodiments, a user of the on-line sports wagering business can include, for example, a customer.

In such embodiments, the database server can correlate the user-specific information by matching the user-specific information with an identifier that is associated with a digital radio receiver, for example. Embodiments also can involve a network that is a satellite radio service. The embodiments can also include broadcasting the user-specific information to the appropriate type of receiver. The broadcast allows an authorized user (i.e., customer) of the receiver to receive the user-specific information. Examples of user-specific information for an on-line sports wagering service includes, for example, a sports score, a sports odd, a sports over/under odds, a player performance information, a team performance information, an account balance, an amount of a wager, and other related wagering information. Other information appropriate for an on-line sports wagering business are known to those in this business.

The techniques described herein also can be used to inform travelers of any travel advisories and other up-to-the-minute travel information that could save travelers time idling in traffic. For example, appropriate re-routing information can be disseminated to a user based upon, for example, the driver's past driving history. In these embodiments, an information provider can include a travel advisory organization. The travel advisory organization (such as a local television station) can include a database server that is in communication with a network. The database server is updated with current travel and traffic information which is retrievably stored along with user-specific information.

In such embodiments, the database server can correlate the user-specific information by matching the user-specific information with an identifier that is associated with a receiver, such as a satellite radio receiver. Also, embodiments can include broadcasting the user-specific information to the satellite radio receiver. The broadcast allows an authorized user (i.e., traveler) of the satellite receiver to receive the user-specific information. Examples of user-specific information beneficial for a traveler includes traffic information such as, for example, a traffic advisory, a traffic accident information, a traffic routing recommendation, a weather information, or a road condition information. Other information appropriate for traffic listeners are known to those in this business.

A detailed description of certain embodiments of the invention is provided below. Other embodiments, features, aspects and advantages of the invention are apparent upon review of the detailed description and accompanying drawings that follows.

DETAILED DESCRIPTION OF THE INVENTION

Figure 1:
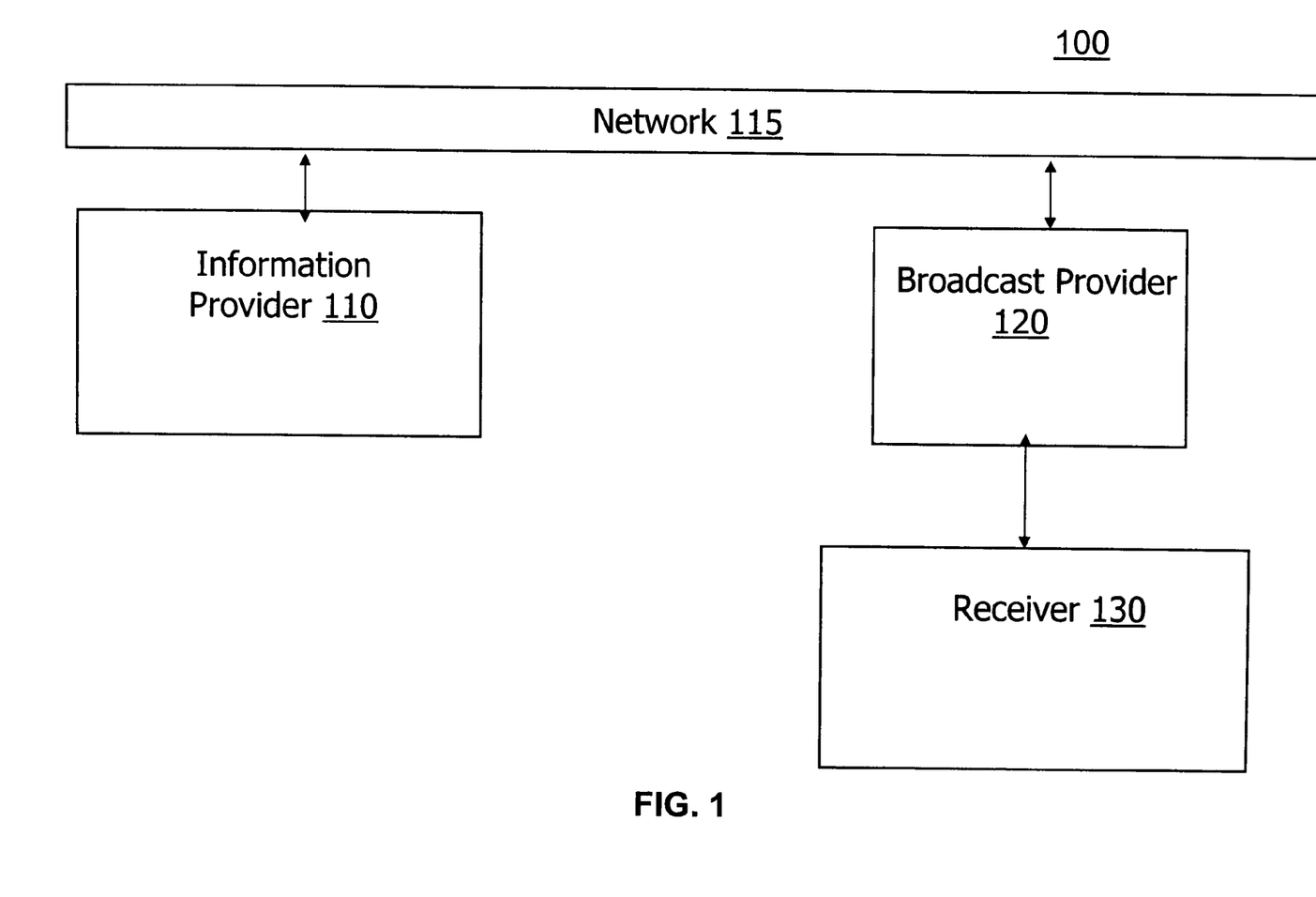
FIG. 1 is a block diagram of an exemplary network for broadcasting user-specific information to a receiver.

FIG. 1 provides an exemplary system 100 for broadcasting user-specific information from an information provider 110. The system 100 includes the information provider 110, a network 115, a broadcast provider 120 and a receiver 130. In the financial services embodiment, as discussed herein, the information provider 110 can be a financial services company such as Fidelity Investments. The information provider 110 transmits user-specific information to a network 115, such as through a web-server. The transfer of user-specific information can be through any appropriate network.

The user-specific information contains an identifier that is unique to the user. The identifier can include any appropriate series of numbers and/or characters, or any other means that enables the information provider 110 to tag the user-specific information to a particular user. The user-specific information then is transmitted from the network 115 to a broadcast provider 120. One example of a broadcast provider 120 is a satellite broadcast provider. XM Satellite Radio and Sirius Satellite Radio are two examples of broadcast providers 120 that digitally transmit information to targeted subscribers. However, any broadcast providers that are capable of digitally transmitting information while discriminating between its users can be utilized. For example, digital radio or other broadcast channels (e.g., AM and FM frequencies) also can be used according to the techniques discussed in more detail herein.

The broadcast provider 120 correlates the user-specific information tagged with the identifier to the appropriate user/receiver and then broadcasts the user-specific information. A receiver 130 accepts the user-specific information that contains the uniquely tagged identifier and ignores all others. At the receiver 130, the user can have the option of listening to the user-specific information or having it displayed at the receiver 130 or any other appropriate console. For example, if the receiver 130 is located in an automobile, the user-specific information (in this case, financial information such as stock ticker symbol and stock quote) can be displayed on a portion of the windshield using, for example, heads up display technology. In addition, any visual display or audio component that is capable of receiving and displaying and/or playing the user-specific information to the user can be included in the receiver 130.

As discussed herein, the broadcast provider 120 can transmit a plurality of user-specific information intended for different receivers 130 (or users) over a single signal or channel. A particular user can access his or her user-specific information that is broadcast over a particular channel by an identifier that is uniquely associated with his or her receiver 130, which is tagged to the user-specific information. A receiver 130 searches for the user-specific information that contains the uniquely tagged identifier. As such, different users can have access to different user-specific information on the same broadcast channel or signal. In other words, during a broadcast, one user's information can be different from that of another user. To reject information not meant for the user associated with the receiver 130, encryption algorithms can include the use of the unique identifier for the receiver 130. Using such a technique ensures that the receiver 130 can only decipher information meant for that specific receiver 130.

The user also can transmit information from the receiver 130 to the broadcast provider 120. The user-specific information can be tracked and maintained securely with the unique identifier associated with the receiver 130 and the user. In another embodiment, the receiver 130 can transmit directly to the information provider 110 (e.g., using other wireless communication channels such as cellular, WLAN, Bluetooth, etc.)

The user-specific information can be an order for securities (e.g., 500 shares of DELL at market price). If the broadcast provider 120 receives the order, the broadcast provider 120 can then transmit this user-specific information via the network 115, to the information provider (e.g., Fidelity Investments) 110. Once the user-specific information (e.g., order request) is accepted by the information provider 110, the order can be executed. Accordingly, after the trade is executed, a trade confirmation (i.e., user-specific information) can be communicated to the user, via the receiver 130, through the network 115 and the broadcast provider 120, as described herein.

Figure 2:
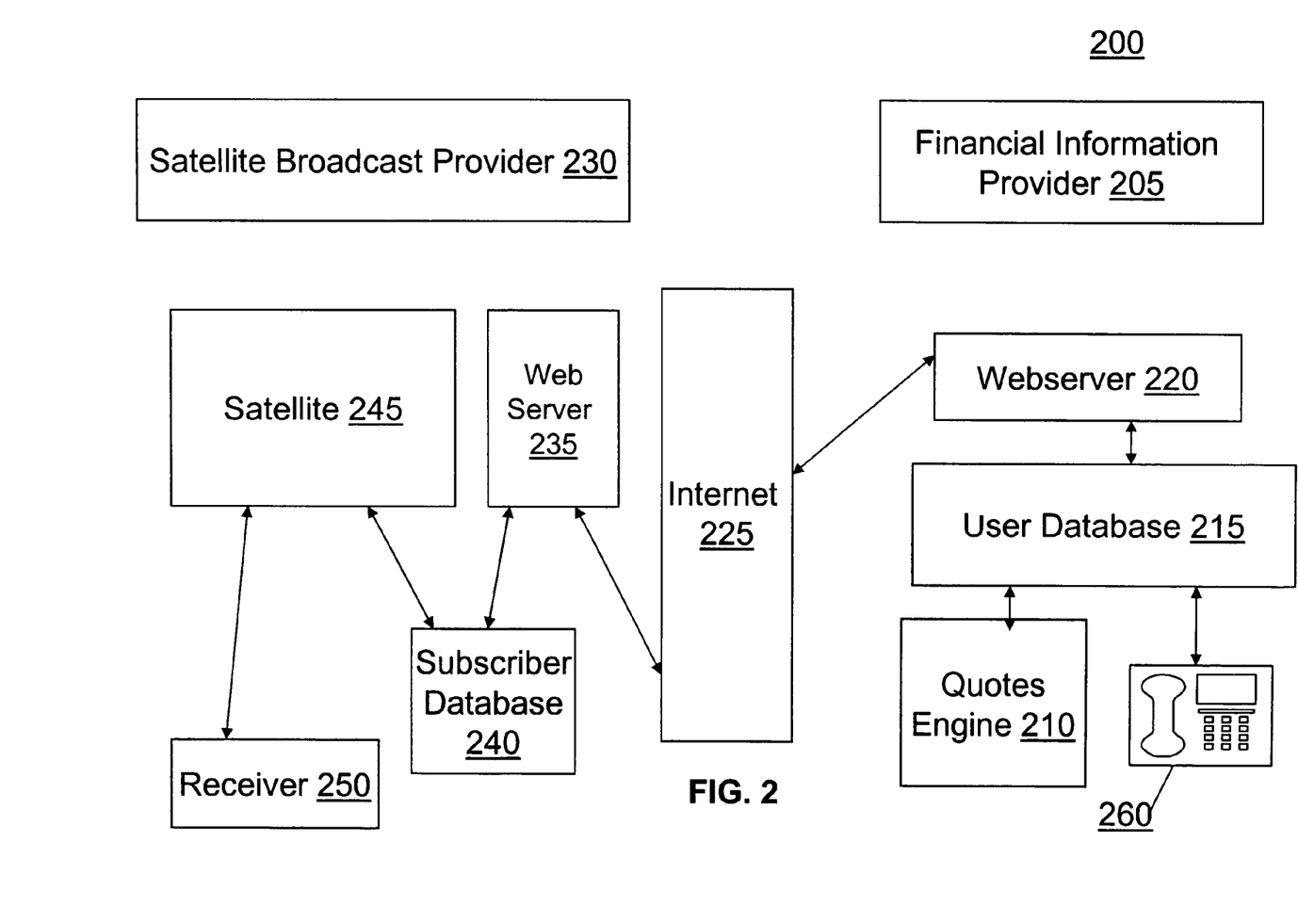
FIG. 2 is a block diagram of an exemplary satellite network for broadcasting user-specific information to a satellite radio receiver.

FIG. 2 provides another exemplary system 200 for broadcasting user-specific financial information from a financial information provider 205. The system 200 includes the financial information provider 205, a quotes engine 210, a user database 215, a financial information provider webserver 220, a WAN 225 (e.g., the Internet), a satellite broadcast provider 230, a satellite broadcast provider webserver 235, a subscriber database 240, a satellite 245 and a receiver 250. A network of an exemplary system 200 described herein can include the Internet, company intranet, and satellite broadcast provider's communication channels.

In the financial services embodiment, the financial information provider 205 can be a financial services company such as Fidelity Investments. The financial information provider 205 can transmit user-specific information intended to be sent to a particular user. In FIG. 2, quotes are transmitted from the quotes engine 210 to a user database 215. The quotes engine 210 is in communication with the user database 215, which includes an identifier that is unique to the financial services customer. The user database 215 is in communication with a financial information provider webserver 220. The quote (tagged with the identifier) is transmitted to the financial information provider webserver 220 securely via the Internet 225. The financial information webserver 220 also is in communication with the Internet 225.

The tagged quote is securely transmitted through the Internet 225 (e.g., using 128-bit cipher strength encryption) to the satellite broadcast provider 230. More specifically, the quote tagged with the user-specific identifier is transmitted to the satellite broadcast provider webserver 235, which is in communication with the Internet 225. Once the quote is received by the satellite broadcast provider webserver 235, the quote is transmitted to the subscriber database 240. The subscriber database 240 is in communication with the satellite broadcast provider webserver 235. At the subscriber database 240, the quote (tagged with the unique identifier) is matched with the appropriate subscriber's receiver 250.

The quote (tagged with the unique identifier) then is transmitted from the subscriber database 240 to a satellite 245 for broadcasting. For example, a satellite broadcast provider 230 can broadcast the quote (tagged with the unique identifier) on a FIDELITY channel or signal. As discussed herein, more than one quote can be transmitted by the satellite broadcast provider 230. For example, a satellite broadcast provider 230, which can be XM Satellite Radio and Sirius Satellite Radio, broadcasts the information via satellite 245 to the appropriate receiver 250. The subscriber database 240 and the satellite 245 are in communication with each other. The appropriate receiver 250 only will accept the quote (e.g., user-specific information) if the information contains the uniquely tagged identifier. As such, different quotes can be accessed by different users or receivers 250. At the receiver 250, the user can either listen to the quote or the quote can be displayed.

In another example, and as shown in FIG. 2, the user can transmit information from the receiver 250 to the financial information provider 205. In some embodiments, the receiver 250 can transmit the information directly to the financial information provider 205. For example, if a quote received by the user is acceptable, the user can manipulate the receiver 250 to transmit a purchase order, (e.g., 500 shares of MSFT) from the receiver 250 to the financial information provider 205. In some embodiments, a user also can transmit a personal identification code ("PIN") to verify that the user is authorized to access his or her financial account. This is particularly of interest for security purposes. In addition to the unique identifier attached to the user-information (i.e., order for 500 shares of MSFT), a PIN code can aid in verifying the identity of the user for the benefit of a financial information provider. The PIN code also can be used in the encryption algorithm (e.g., a key) to ensure only the systems with knowledge of the PIN code will be able to decipher the transmitted information.

In some embodiments, the receiver 250 can transmit the purchase order to the satellite 245, which directs the purchase order to the subscriber database 240. The purchase order is relayed to the satellite broadcast provider webserver 235, and further relayed through the Internet 225. The satellite 245 also can bypass the subscriber database 240 and relay the purchase order (or any other user-specific information) directly to the satellite broadcast provider webserver 235 for transmission to the Internet 225. The purchase order can arrive at the financial information provider 205, or more specifically by the financial information provider webserver 220. Thereafter, the purchase order can be relayed to the user database 215, and can be directed to a broker 260 for order execution. After the order is executed, the financial information provider 205 can relay an order execution confirmation to the receiver 250 by way of the techniques described herein. In some embodiments, the financial information provider 205 can instruct the satellite broadcast provider 230 to "break-in" to the receiver 250 by transmitting the order execution confirmation, for example, to the receiver 250 regardless of the particular station or channel that the receiver 250 is then-currently receiving.

In some examples, the financial information provider 205 can have multiple channels on which the provider 205 delivers information. For example, one channel can be a public channel that is available (e.g., not encrypted) for all subscribers of the satellite broadcast provider 230. Another channel can be limited to subscribers of the financial information provider 205 (such as a premium Fidelity Investments channel). Here, the encryption techniques can be the same as the ones the satellite broadcast provider 230 uses to enable premium channel selection and reception. Another channel can be a channel for delivering the user-specific information. In other examples, where bandwidth allows, these three channels can be combined into a single channel.

Figure 3:
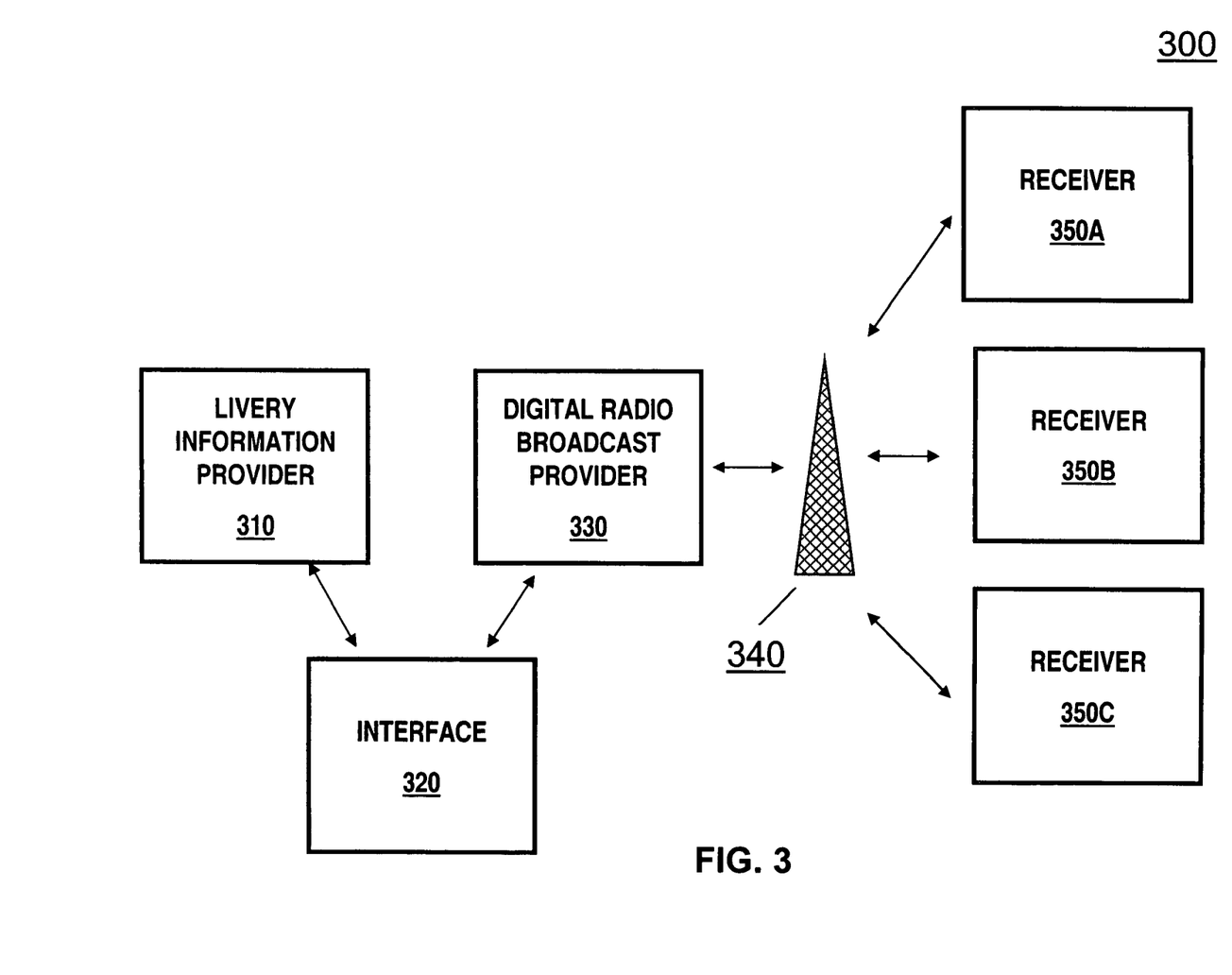
FIG. 3 is a block diagram of an exemplary digital radio network for broadcasting user-specific information to a digital radio receiver.

FIG. 3 provides an exemplary network 300 for broadcasting user-specific information from a livery information provider 310 using a high-definition radio transmission. The network 300 includes the livery information provider 310, an interface 320, a digital radio broadcast provider 330, a broadcast tower 340 and a plurality of receivers 350A, 350B and 350C. In the livery services embodiment, the livery information provider 310 can be a service company such as Boston Coach. The livery information provider 310 transmits user-specific information through an interface 320, such as through a web-server. As described herein, user-specific information can be, for example, a pick-up location, a drop-off location, a time for the pick-up location, passenger information, or any other information appropriate for a livery service.

The user-specific information contains an identifier that is unique to the driver of a livery, for example. The user-specific information is transmitted from the interface 320 to a digital radio broadcast provider 330. High-definition digital radio offers CD-quality sound on the FM band and brings FM stereo-quality to the AM band. For example, radio stations bundles a digital HD radio signal, which include digital binary numbers and a traditional analog wave-form, to a broadcast tower 340. At the broadcast tower 340, the digital signal is compressed and the combined signals are broadcast over the frequency assigned to the station. In one embodiment, the traditional AM/FM receivers still get the analog signal, while those with high-definition receivers decode the digital signal. One advantage of high-definition digital radio over conventional radio is that the high definition receivers can receive digital information (e.g., user information) on a display, for example.

The digital radio broadcast provider 330 correlates the user-specific information with an identifier so that the appropriate receiver has access to the information. The digital radio provider 330 can broadcast the user-specific information (appropriately tagged with the unique identifier) through the broadcast tower 340. The appropriate receiver, such as one of receivers 350A, 350B or 350C, accepts the user-specific information that contains the uniquely tagged identifier. At the appropriate receiver 350A, 350B or 350C, the user can have the option of listening to the user-specific information or having the user-specific information displayed. In some embodiments, the identifier can act as the key for decrypting or de-multiplexing the signal.

Likewise, the user can also transmit information from the receiver 350A, 350B, or 350C to the digital radio broadcast provider 330. The user-specific information can be tracked and maintained securely with the unique identifier associated with the receiver 350A, 350B or 350C and the user. The digital radio broadcast provider 330 can receive the user-specific information and forward the information through the interface 320 to the livery information provider 310.

Figure 4:
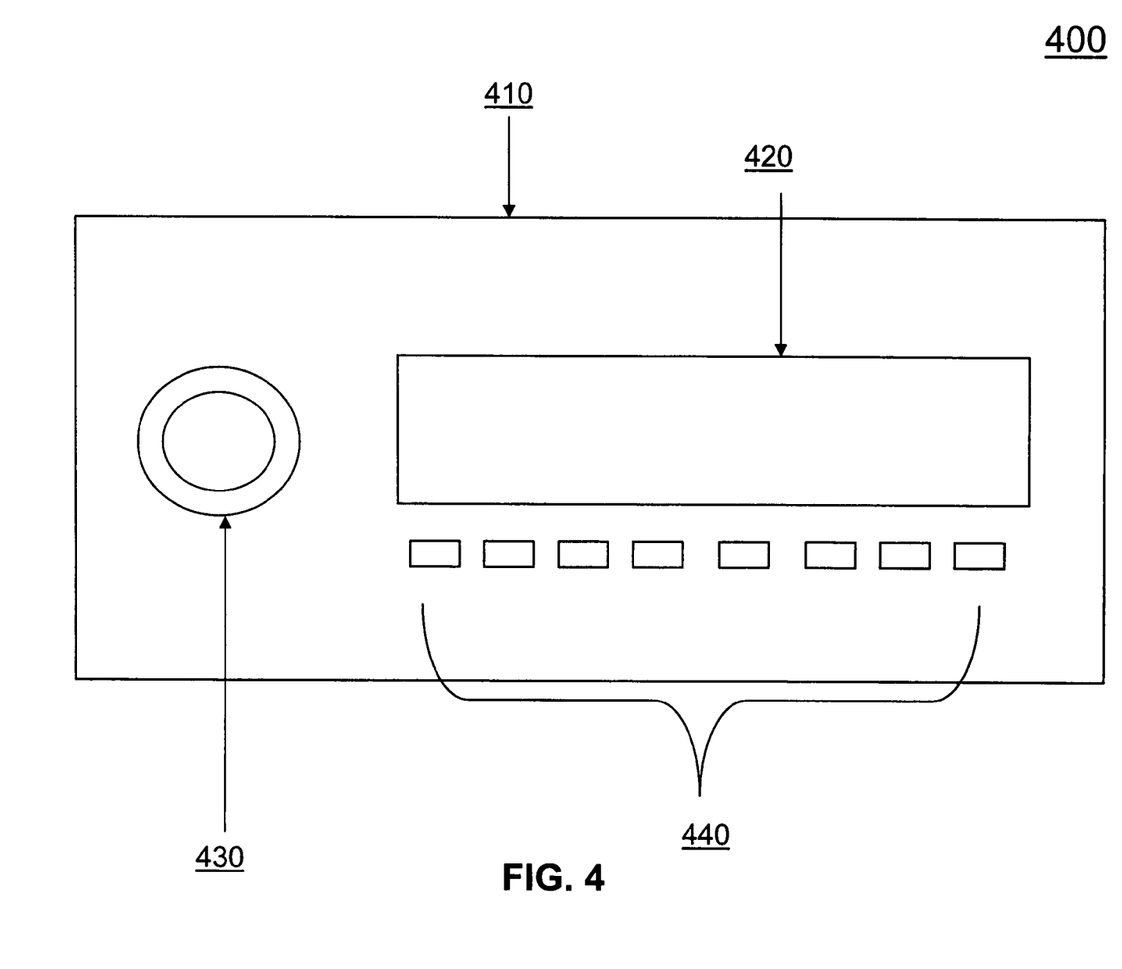
FIG. 4 is an exemplary receiver for use with a network.

FIG. 4 provides an exemplary satellite receiver 400 for use in receiving and transmitting user-specific information. The satellite receiver 400 can be equipped or programmed to allow a user to transmit information from the receiver 400 back to the satellite broadcast provider (e.g., provider 230) or to the information provider (e.g., provider 205). In this example, a satellite receiver 400 includes a housing 410, a display 420, a turn dial 430, and a plurality of buttons 440. One advantage of this embodiment of the satellite receiver 400 is that these components typically exist on many satellite receivers. As such, no special features need to be added to the physical make-up of the receiver 400 to provide functionality to the satellite receiver 400 in order for information to be transmitted.

The following is exemplary functionality for a satellite receiver 400 (or any other appropriate receiver, such as a digital radio receiver) that uses each of the hardware components already typically found on the device. For example, the display 420 is already designed to receive digital information that is broadcast by the satellite broadcast provider. Most receivers 400 generally have a turn dial 430 that, depending on the model, can change the frequency received by the user or adjust the audio volume of the broadcast. The turn dial 430, however can also be used to go forwards or backwards through the alphabet by turning the turn dial 430 to the right or left. For example, turning the turn dial 430 to the right can advance a letter from A to B to C, and so on. Manipulating the turn dial 430 can change the letter from C to B back to A, for example. Similarly, the turn dial can be used to change a numeral from 0 to 9, for example. As such, a user can transmit any alphanumeric information to the intended recipient (e.g., information provider or broadcast provider), such as, for example, a PIN code, a financial order request, a location for pick-up, a sports wager, and so on.

In addition, the receiver 400 can include a plurality of buttons 440. In some embodiments, the buttons can represent pre-programmed stations. In other embodiments, two of the buttons can also be used to function like a turn dial, one button advancing through the alphabet (or number), and another button acting to go backwards through the alphabet (or number). Pressing one of the buttons can also serve to move to the next letter or number. In other embodiments, pressing one of the buttons can serve to act as a "SEND" signal to transmit the information from the receiver 400 to the broadcast provider. In some embodiments, however, the receiver 400 can bypass the broadcast provider and transmit the information directly to the information provider, such as a financial services company (e.g., Fidelity Investments).

Figure 5:
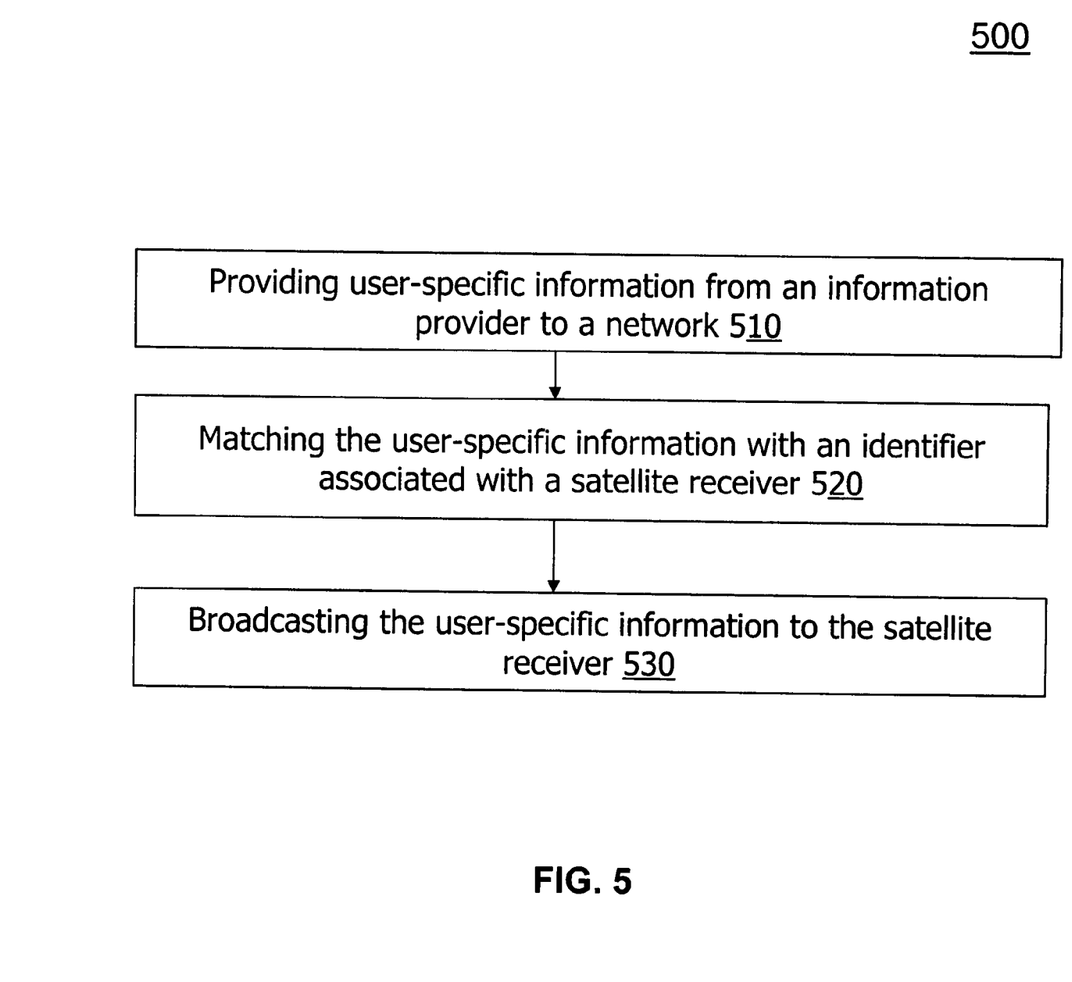
FIG. 5 is a block diagram of an exemplary process for broadcasting user-specific information to a satellite radio receiver.

FIG. 5 provides an exemplary flow diagram 500 for a process of broadcasting user-specific information to a receiver, such as broadcasting financial information via a satellite broadcast provider. Generally, user-specific information is provided 510 from an information provider comprising a first database server in communication with a network. The first database server retrievably stores the user-specific information. The user-specific information received from the information provider is correlated with a second database server of a satellite broadcast provider. The user-specific information is matched 520 with an identifier associated with a satellite receiver. The user-specific information is broadcast 530 to the satellite receiver. The broadcast allows an authorized user of said satellite receiver to access said user-specific information.

The above-described systems and methods can be implemented, in whole or in part, in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Some data transmission and instructions can also occur over a network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a receiver having a display device, e.g., a CRT (cathode ray tube) or LCD (liquid crystal display), for displaying information to the user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of networks include a local area network ("LAN") and a wide area network ("WAN"), e.g., the Internet, and include both wired and wireless networks.

The computing system can include clients and servers. A client and server are generally remote from each other and typically interact through a network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A system for broadcasting user-specific information, the system comprising:
   a network;
   an information provider system configured to receive a request comprising an alphanumeric PIN code established with the information service provider inputted by a user through any receiver on a network, verify said user as an authorized user based on said PIN code from said request, and transmit to a broadcast provider system, which is different than said information provider system, information specific to said authorized user; and
   said broadcast provider system configured to associate said information with said receiver based on said request and said verification of said authorized user, and broadcast said information to said receiver, such that said broadcast of the information is restricted to said receiver from which the user inputted the request.

2. The system of claim 1, wherein said receiver comprises a satellite radio receiver, a digital radio receiver, or combinations thereof.

3. The system of claim 1, wherein said broadcast provider comprises a satellite broadcast provider, a digital radio broadcast provider, or combinations thereof.

4. The system of claim 1, further comprising a plurality of receivers, wherein each receiver of said plurality of receivers is associated with one or more users based on said one or more users being verified by said information provider system.

5. The system of claim 4, wherein said broadcast provider system broadcasts information specific to said user to said plurality of receivers.

6. The system of claim 5, wherein each of said plurality of receivers not being associated with said authorized user is unable to receive said information specific to said authorized user.

7. The system of claim 1, wherein said receiver associated with said authorized user is able to receive said information specific to said authorized user.

8. The system of claim 1, wherein said receiver transmits information to said information provider system.

9. The system of claim 1, wherein said receiver receives said information specific to said authorized user based on said receiver being associated with said authorized user.

10. The system of claim 1, wherein said request is encrypted.

11. The system of claim 1, wherein said PIN code is encrypted.

12. The system of claim 1, wherein said broadcast provider system broadcasts second information over a first channel, wherein the second information is available for all users.

13. The system of claim 1, wherein said broadcast provider system broadcasts third information over a second channel, wherein the third information is available to subscribers of said second channel.

14. The system of claim 13, wherein said broadcast provider system broadcasts information specific to said user over said second channel.

15. The system of claim 1, further comprising at least one web server in communication with said network.

16. The system of claim 1, wherein said user-specific information comprises a financial information, a real-time livery information, a sports information, a traffic information, general information, or combinations thereof.

17. The system of claim 16, wherein said financial information comprises a security ticker, a security name, a security quote, a security position, a market value of said security position, a trade confirmation, a trade recommendation, a security news alert, an account alert, an account balance, or combinations thereof.

18. The system of claim 16, wherein said real-time livery information comprises a pick-up location, a drop-off location, a time for said pick-up location, a passenger information, or combinations thereof.

19. The system of claim 16, wherein said sports information comprises a sports score, a sports odds, a sports over/under, a player performance information, a team performance information, or combinations thereof.

20. The system of claim 16, wherein said traffic information comprises a traffic advisory, a traffic accident information, a traffic routing recommendation, a weather information, a road condition information, or combinations thereof.

21. The system of claim 16, wherein said general information comprises financial information selected from the group consisting of a financial quote, a ticker symbol, a security price, a time of last trade, a news alert, or combinations thereof.

22. The system of claim 1, wherein said information provider comprises an user database and said user database stores said information specific to a user.

23. The system of claim 1, wherein said broadcast provider comprises a subscriber database and said subscriber database stores said ownership associated with said receiver.

24. The system of claim 1, wherein said information provider system instructs said broadcast provider system to change the communication between said broadcast provider system and said receiver to a transmission of a second information specific to said user.

25. The system of claim 24, wherein said second information specific to said user comprises information that is classified as important, information that is classified as time-sensitive, an order execution confirmation, a margin call, a financial quote, a ticker symbol, a security price, a time of last trade, a news alert, or combinations thereof.

26. The system of claim 1, wherein if the user is authorized to access said information specific to said user then said receiver enables access to said information for broadcast, display, or combinations thereof.

27. The system of claim 1, wherein said information is broadcast over a single signal.

28. The system of claim 1, wherein said information comprises a uniquely tagged identifier.

29. The system of claim 1, wherein said request further comprises a purchase order for shares of a security.

30. The system of claim 1, wherein one or more keys for encryption, decryption, or both are based on said PIN code.

31. The system of claim 1, wherein the user is an employee of a service provider company and the receiver to which the user inputs said request is a receiver associated with a car owned by the service provider company.

32. A method for broadcasting user-specific information, the method comprising:
   receiving a request comprising an alphanumeric PIN code established with an information service provider inputted by the user through any receiver on a network, at an information provider;
   verifying said user, at said information provider, as an authorized user based on said alphanumeric PIN code from said inputted request;
   transmitting from said information provider to a broadcast provider, which is different than said information provider, information specific to said authorized user;

associating at said broadcast provider said information with said receiver based on said request and said verification of said authorized user; and broadcasting from said broadcast provider said information to said receiver, such that said broadcast of said information is restricted to said receiver from which the user inputted the request.

33. The method of claim 32, wherein said receiver comprises a satellite radio receiver, a digital radio receiver, or combinations thereof.

34. The method of claim 32, wherein said broadcast provider comprises a satellite broadcast provider, a digital radio broadcast provider, or combinations thereof.

35. The method of claim 32, wherein said receiver is one of a plurality of receivers that said user can utilize to transmit said request.

36. The method of claim 32, wherein receiving comprises receiving said request at a web server in communication with said network, said web server being associated with said information provider.

37. The method of claim 32, wherein said user-specific information comprises a financial information, a real-time livery information, a sports information, a traffic information, general information, or combinations thereof.

38. The method of claim 37, wherein said financial information comprises a security ticker, a security name, a security quote, a security position, a market value of said security position, a trade confirmation, a trade recommendation, a security news alert, an account alert, an account balance, or combinations thereof.

39. The method of claim 37, wherein said real-time livery information comprises a pick-up location, a drop-off location, a time for said pick-up location, a passenger information, or combinations thereof.

40. The method of claim 37, wherein said sports information comprises a sports score, a sports odds, a sports over/under, a player performance information, a team performance information, or combinations thereof.

41. The method of claim 37, wherein said traffic information comprises a traffic advisory, a traffic accident information, a traffic routing recommendation, a weather information, a road condition information, or combinations thereof.

42. The method of claim 37, wherein said general information comprises financial information selected from the group consisting of a financial quote, a ticker symbol, a security price, a time of last trade, a news alert, or combinations thereof.

43. The method of claim 32, further comprising instructing, by said information provider, said broadcast provider to change the communication between said broadcast provider and said receiver to a transmission of a second information specific to said user.

44. The method of claim 43, wherein said second information specific to said user comprises information that is classified as important, information that is classified as time-sensitive, an order execution confirmation, a margin call, a financial quote, a ticker symbol, a security price, a time of last trade, a news alert, or combinations thereof.

45. The method of claim 32, wherein said information is broadcast over a single signal.

46. The method of claim 32, further comprising appending a uniquely tagged identifier to said information.

47. The method of claim 46, further comprising searching, by the receiver, for said information containing said uniquely tagged identifier.

48. The method of claim 32, wherein said request further comprises a purchase order for shares of a security.

49. The method of claim 32, furthering comprising encrypting the information, decrypting the information, or both, using one or more keys based on the PIN code.

50. The method of claim 32, further comprising displaying said information specific to said authorized user on a portion of a windshield.

51. A computer program product, tangibly embodied in an information carrier, for broadcasting user-specific information, the computer program product including instructions being operable to cause data processing apparatus to:

receive a request comprising an alphanumeric PIN code established by an information service provider, inputted by a user through any receiver on a network, at an information provider;

verify said user, at said information provider, as an authorized user based on the alphanumeric PIN code from said request;

transmit from said information provider to a broadcast provider, which is different than said information provider, said information specific to said authorized user;

associate at said broadcast provider, said information with said receiver based on said request and said verification of said authorized user; and broadcast, from said broadcast provider, said information to said receiver, such that said broadcast of said information is restricted to said receiver from which the user inputted the request.

* * * * *